(12) United States Patent
Fukui

(10) Patent No.: US 10,340,614 B2
(45) Date of Patent: Jul. 2, 2019

(54) ELECTRONIC DEVICE

(71) Applicant: TOYODA GOSEI CO., LTD., Kiyosu-shi, Aichi-ken (JP)

(72) Inventor: Hirotaka Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/834,326

(22) Filed: Dec. 7, 2017

(65) Prior Publication Data

US 2018/0175524 A1 Jun. 21, 2018

(30) Foreign Application Priority Data

Dec. 15, 2016 (JP) .................. 2016-243618

(51) Int. Cl.
| | |
|---|---|
| *H01R 12/57* | (2011.01) |
| *B60Q 3/00* | (2017.01) |
| *H01R 12/72* | (2011.01) |
| *F21V 23/06* | (2006.01) |
| *F21V 19/00* | (2006.01) |
| *F21V 23/04* | (2006.01) |
| *H01R 107/00* | (2006.01) |

(52) U.S. Cl.
CPC .............. *H01R 12/57* (2013.01); *B60Q 3/00* (2013.01); *H01R 12/722* (2013.01); *F21V 19/00* (2013.01); *F21V 23/04* (2013.01); *F21V 23/06* (2013.01); *H01R 2107/00* (2013.01)

(58) Field of Classification Search
CPC ...... H05K 5/0052; H01R 13/64; H01R 12/57; H01R 12/722; B60Q 3/00
USPC ........................................ 362/362
See application file for complete search history.

(56) References Cited

U.S. PATENT DOCUMENTS

| | | | |
|---|---|---|---|
| 2009/0068862 A1* | 3/2009 | Honda | ................ H05K 5/0052 439/78 |
| 2010/0045581 A1* | 2/2010 | Yeon | ...................... H01R 13/64 345/87 |

FOREIGN PATENT DOCUMENTS

| | | |
|---|---|---|
| JP | 2011-233307 A | 11/2011 |
| JP | 2014-127232 A | 7/2014 |

\* cited by examiner

*Primary Examiner* — Daniel A Hess
(74) *Attorney, Agent, or Firm* — Posz Law Group, PLC

(57) ABSTRACT

An electronic device includes: a substrate; a housing which covers the substrate; a conductive pin mounted on one edge portion of the substrate. The conductive pin projects from the substrate along a plane of the substrate, the conductive pin includes a projection portion and a soldered portion which is soldered to the substrate, and the soldered portion includes a conducting portion which is electrically conduction with a circuit wiring of the substrate.

7 Claims, 5 Drawing Sheets

ELECTRONIC DEVICE

CROSS-REFERENCE TO RELATED APPLICATION(S)

This application is based upon and claims the benefit of priority from prior Japanese patent application No. 2016-243618, filed on Dec. 15, 2016, the entire contents of which are incorporated herein by reference.

BACKGROUND

The present invention relates to an electronic device.

As a method for fixing a conductive pin to a substrate of an electronic device, a method for fixing a base connector, which has a conductive pin and is separated from a substrate to the substrate has been widely used. As an example of such a base connector, JP-A-2011-233307 discloses a base connector. The base connector described in JP-A-2011-233307 includes a rectangular tubular base housing made of synthetic resin, and two base contacts housed in the base housing, and each base contact includes a contact portion and a lead portion, and the lead portion is soldered to a substrate (see Paragraphs [0023], [0024], [0029], [0035], etc. of JP-A-2011-233307).

As another example of the base connector separated from the substrate and fixed to the substrate by soldering, JP-A-2014-127232 discloses a connector for a substrate.

When the base connector which is separated from the substrate as described in JP-A-2011-233307 or JP-A-2014-127232 is used to fix the conductive pin to the substrate, there is a problem that a production cost of the device is increased. In addition, since the base connector is mounted on the substrate, there is a problem that a dimension of the device in a thickness direction is increased due to a height of the base connector.

SUMMARY

It is therefore an object of the invention to provide an electronic device in which a conductive pin is fixed to a substrate of an electronic device without a base connector separated from the substrate and which is capable of exhibiting sufficient fixing strength.

In order to achieve the object, according to an aspect of the invention, there is provided an electronic device comprising: a substrate; a housing which covers the substrate; a conductive pin mounted on one edge portion of the substrate, wherein the conductive pin projects from the substrate along a plane of the substrate, the conductive pin includes a projection portion and a soldered portion which is soldered to the substrate, and the soldered portion includes a conducting portion which is electrically conduction with a circuit wiring of the substrate.

BRIEF DESCRIPTION OF THE DRAWINGS

FIG. 4A is a perspective view, and FIG. 4B is an exploded perspective view.

DETAILED DESCRIPTION OF EXEMPLARY EMBODIMENTS

Figure 1:
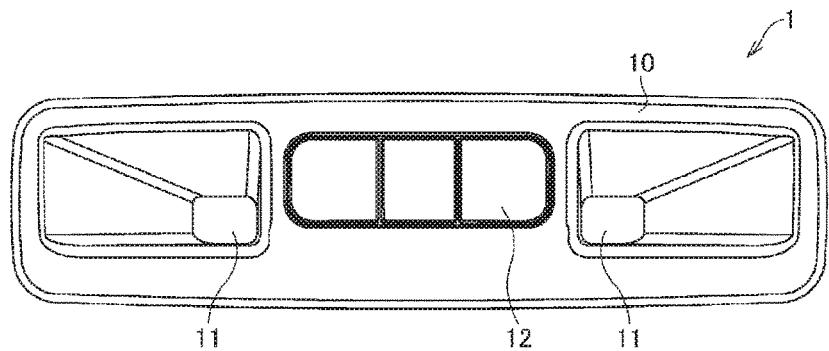
FIG. 1 is a front view of a lighting device according to an embodiment of the present invention.
Figure 2:
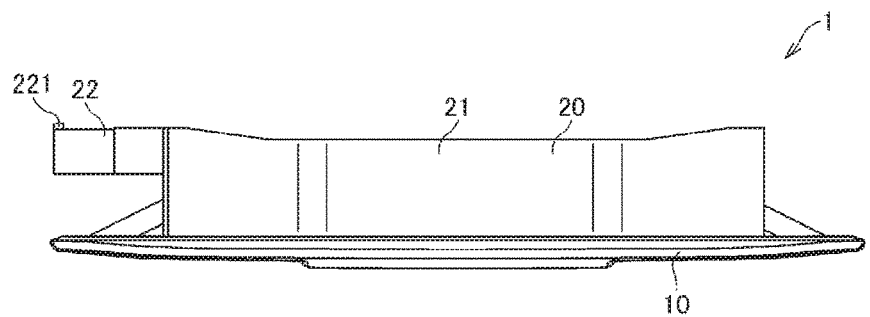
FIG. 2 is a side view of the lighting device according to the embodiment.
Figure 3:
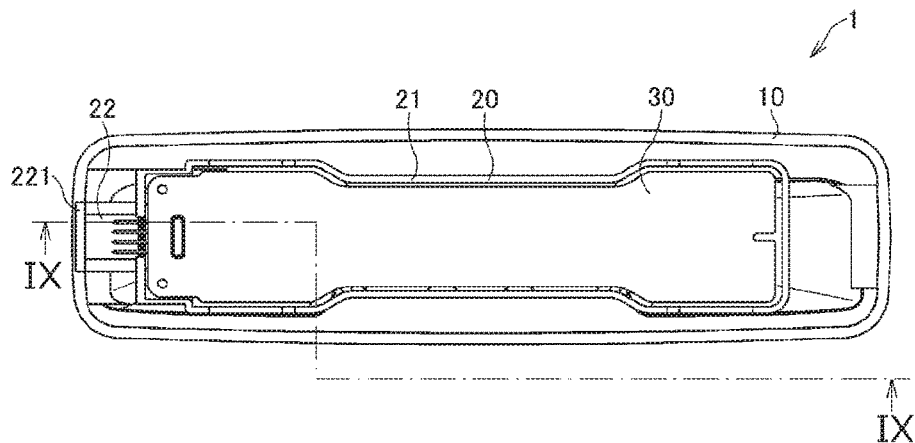
FIG. 3 is a rear view of the lighting device according to the embodiment.

Hereinafter, a lighting device will be described as an example of an electronic device according to one embodiment of the present invention. However, an electronic device to which the present invention can be applied is not limited to the lighting device. FIG. 1 is a front view of a lighting device 1 according to the embodiment of the present invention, FIG. 2 is a side view of the lighting device 1, and FIG. 3 is a rear view of the lighting device 1. Specifically, the lighting device 1 of the illustrated example is a map lamp provided on a ceiling of a vehicle compartment of an automobile, and includes a design portion 10 including a light emitting portion 11 and a switch portion 12, a housing 20 attached to a rear side of the design portion 10 or integrally formed therewith, a substrate 30 housed in the housing 20, and a pin header 40 mounted on the substrate 30.

Figure 4A:
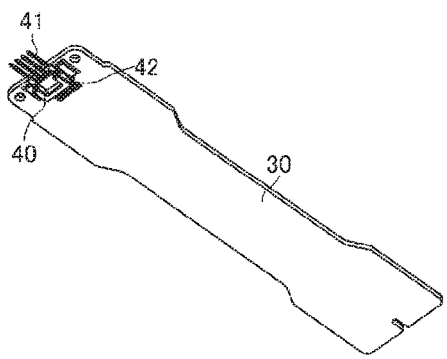
FIGS. 4A and 4B are views showing a substrate of the lighting device according to the embodiment.
Figure 4B:
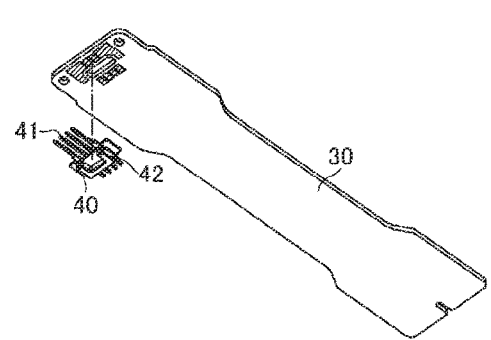
Figure 6:
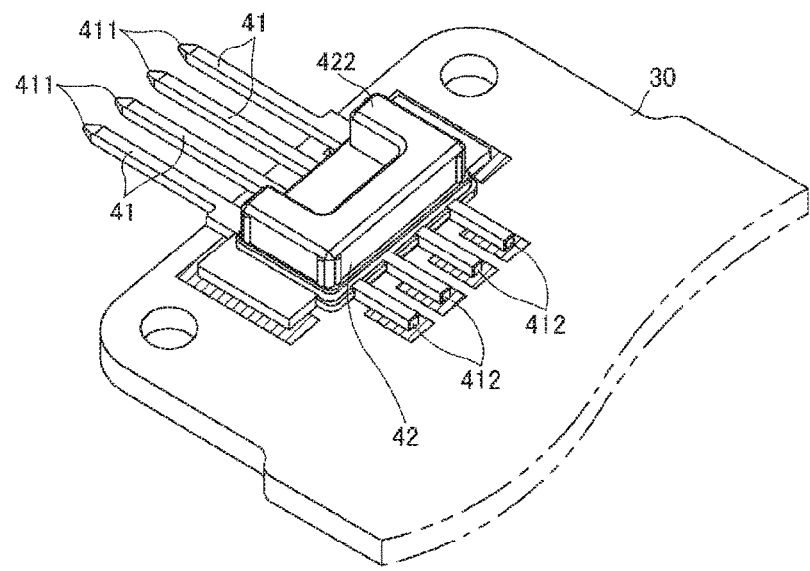
FIG. 6 is a perspective view showing main portions of the substrate in FIG. 4A.
Figure 7A:
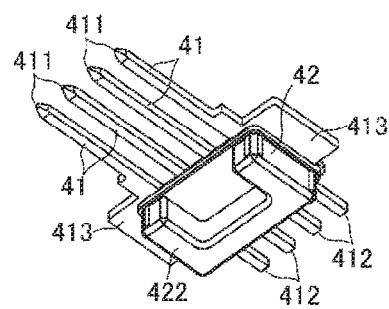
FIG. 7A and FIG. 7B are perspective views showing a pin header in FIG. 6.
Figure 7B:
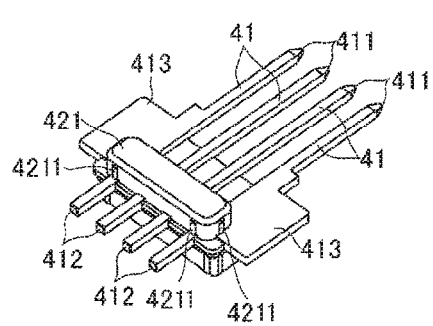
Figure 7C:
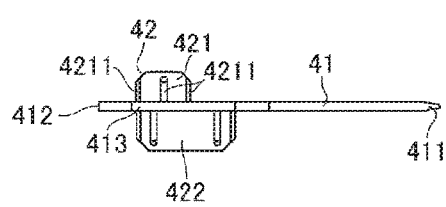
FIG. 7C is a side view of the pin header.

FIG. 4A is a perspective view showing a side on which the pin header 40 is mounted on the substrate 30. FIG. 4B is a view showing a state before the pin header 40 is mounted on the substrate 30. FIG. 6 is an enlarged perspective view showing a state where the pin header 40 is mounted on one edge portion of the substrate 30 (that is, a portion in the vicinity of one of edges). FIG. 7A is a perspective view of the pin header 40. FIG. 7B is a perspective view showing an opposite side of the pin header 40 in FIG. 7A, that is, a side fixed to the substrate 30. FIG. 7C is a view of the pin header 40 viewed from a side (that is, a side of a side surface).

Figure 7D:
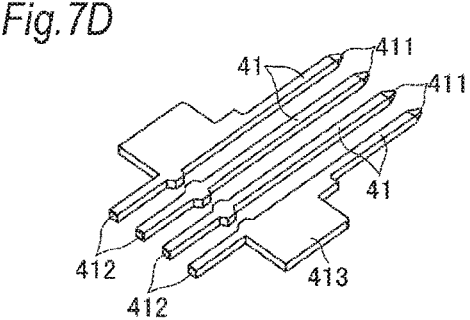
FIG. 7D is a perspective view showing only pins of the pin header.

As shown mainly in FIG. 6, and FIGS. 7A to 7C, the pin header 40 includes a plurality of pins 41 (conductive pins) made of a metal having conductivity and a resin portion 42 made of synthetic resin having an insulation property. The pin header 40, for example, is formed by loading the plurality of pins 41 in a resin molding die such that the pins 41 are spaced apart from each other and longitudinal directions thereof are parallel to each other as shown in FIG. 7D, then injecting resin into the molding die and covering a portion excluding at least two end portions of each of the plurality of pins 41 with molten resin, solidifying the resin to form the resin portion 42, and integrating the plurality of pins 41 with the resin portion 42.

As shown in FIGS. 7A to 7C, the resin portion 42 of the pin header 40 includes a first projection portion 421 projecting to one side of a direction orthogonal to a plane on which the plurality of pins 41 are arranged and a second projection portion 422 projecting to the other side of the direction. In the first projection portion 421 and the second projection portion 422, the portion projecting to a side opposite to the substrate 30 is defined as the first projection portion 421, and the portion projecting to a side on the substrate 30 is defined as the second projection portion 422 when the pin header 40 is attached to the substrate 30.

As shown in FIGS. 4A and 6, the pin header 40 is mounted on the one edge portion of the substrate 30, at this time, a portion including the tip end portions 411 of the plurality of pins 41 is mounted so as to project from one edge of the substrate along the same plane as the substrate 30 (that is, parallel to the substrate 30). An end portion on the side opposite to the tip end portion 411 of each pin 41 is referred to as a base end portion 412. The mounting of the pins 41 on the substrate 30 is performed by soldering. Details of soldering will be described later. In addition to the pin header 40, elements such as light emitting elements (not shown) are mounted on the substrate 30.

Figure 5:
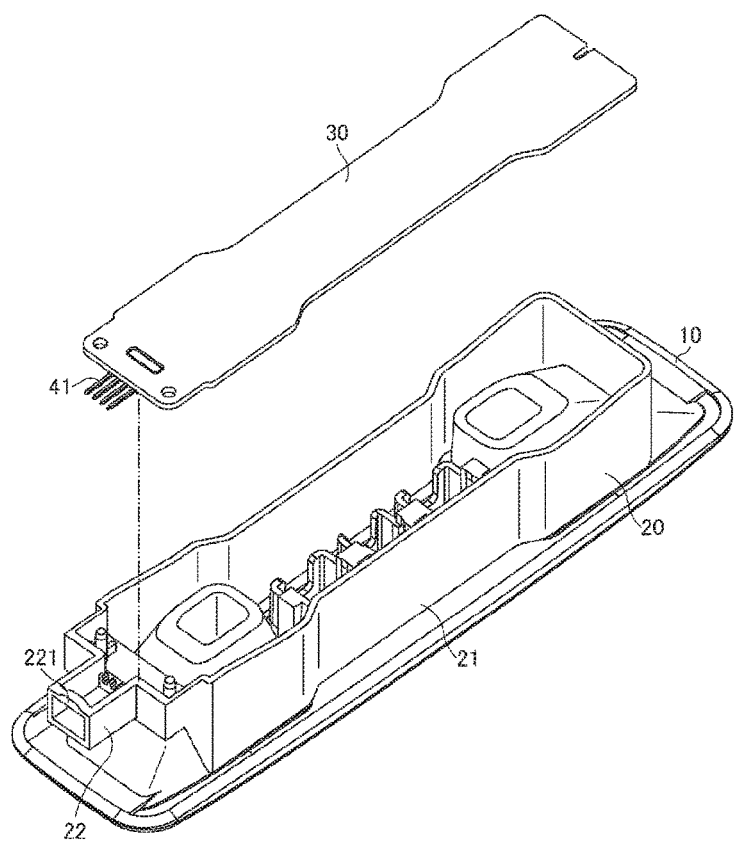
FIG. 5 is an exploded perspective view of the lighting device according to the embodiment.

FIG. 5 is an exploded perspective view of the lighting device 1. As shown in FIG. 5, the substrate 30 is housed and fixed on an inner side of the housing 20 from an opening on a rear side of the housing 20. The housing 20 includes a substrate housing portion 21 for housing the substrate 30 and a pin housing portion 22 for housing portions of the plurality of pins 41 projecting from the substrate 30 (namely, projection portions). By being combined with each other, the plurality of pins 41 and the pin housing portion 22 function as a connector to be connected to a socket connector. Therefore, an opening for receiving the socket connector is formed on a tip end side (that is, a side of a direction to which the projection portions of the pins 41 project) of the pin housing portion 22, and an engagement portion 221 for engaging with a hook of the socket connector is formed at an edge of the opening. When the socket connector is connected to a connector of the lighting device 1, a portion of the plurality of pins 41 projecting from one edge of the substrate 30 into the pin housing portion 22 is brought into contact with a terminal of the socket connector, thereby realizing conduction.

In this manner, the pins 41 are directly fixed to the one edge portion of the substrate 30, tip ends of the pins 41 are projected from the one edge of the substrate in parallel with the substrate 30, and the pins 41 and the housing 20 are enabled to function as a connector, and thereby the number of parts can be reduced and moreover the dimension of the lighting device 1 in the thickness direction can be reduced, as compared with a case where a connector separated from the substrate 30 is used.

Figure 9:
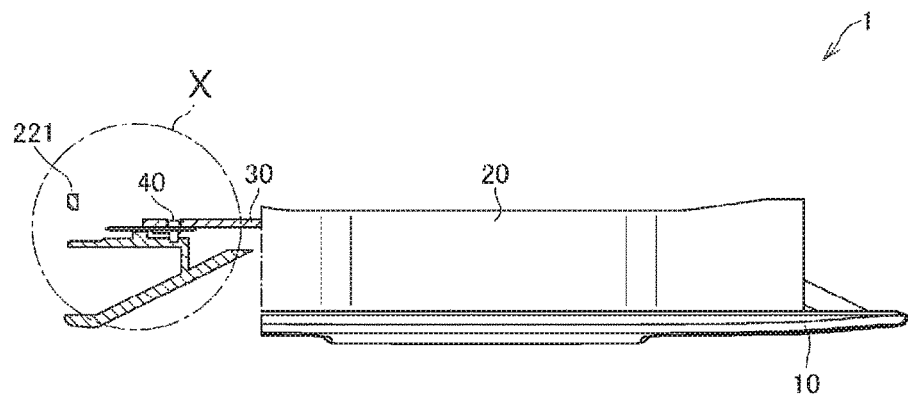
FIG. 9 is a partial cross-sectional view showing a state where the lighting device cut along a one-dot chain line IX-IX in FIG. 3 is viewed in an arrow direction.
Figure 10:
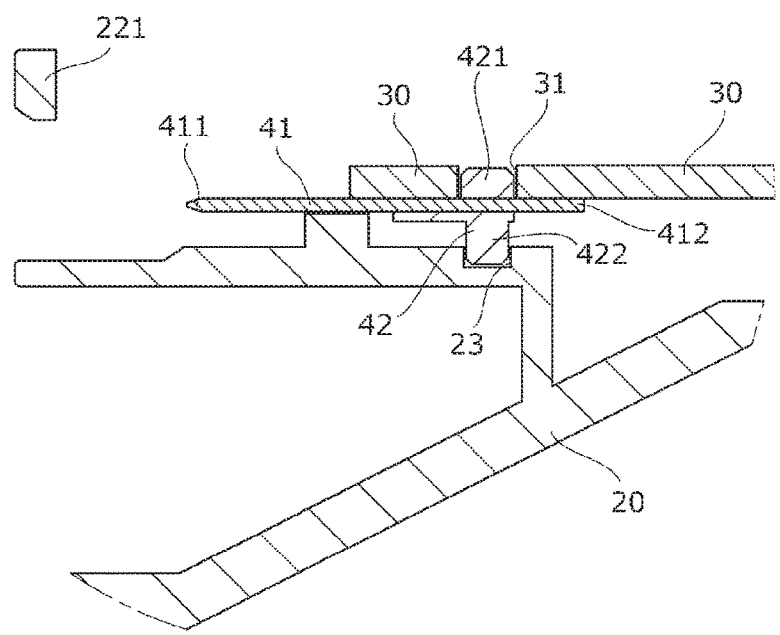
FIG. 10 is an enlarged partial cross-sectional view showing an enlarged cross-sectional portion of the lighting device surrounded by a one-dot chain line X in FIG. 9.

FIG. 9 is a partial cross-sectional view showing a state where the lighting device 1 cut along a one-dot chain line IX-IX in FIG. 3 is viewed in an arrow direction, and FIG. 10 is an enlarged partial cross-sectional view showing an enlarged cross-sectional portion of the lighting device 1 surrounded by a one-dot chain line X in FIG. 9. As shown in these drawings, a recess portion 31 is formed on the one edge portion of the substrate 30 and the first projection portion 421 of the pin header 40 is fitted to the recess portion 31 when the pin header 40 is fixed to the substrate 30, thereby positioning the pin header 40 with respect to the substrate 30. As shown in FIG. 7B, a plurality of ribs 4211 is formed on a side surface of the projection portion 421. When the projection portion 421 is inserted into the recess portion 31 of the substrate 30, the ribs 4211 are strongly brought into contact with an inner peripheral surface of the recess portion 31, and thereby a state where the projection portion 421 is tightly fitted to the recess portion 31 is formed. Accordingly, the positioning accuracy of the pin header 40 with respect to the substrate 30 is improved. A recess portion 23 to which the second projection portion 422 of the pin header 40 is fitted is formed in the housing 20, by fitting the second projection portion 422 to the recess portion 23, positioning of the pin header 40 (in particular, the pins 41) with respect to the housing 20 is performed.

As shown in FIGS. 7A to 7D, two pins 41 positioned at both ends in a direction orthogonal to the longitudinal direction of the plurality of pins 41 (that is, an arrangement direction of the plurality of pins 41) include protrusion portions 413 each protruding outward therefrom in the arrangement direction. The protrusion portions 413 are positioned between the tip end portion 411 and the base end portion 412 in the longitudinal direction of the pins 41. The protrusion portions 413 are exposed from the resin portion 42.

Figure 8A:
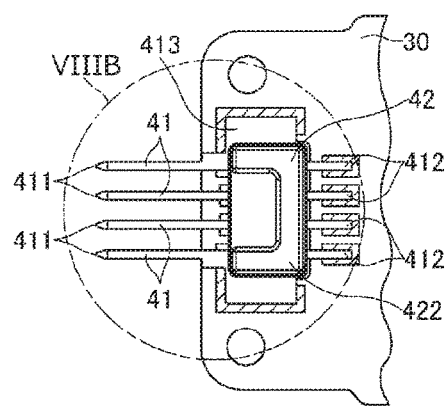
FIG. 8A is a plan view showing the main portions of the substrate in FIG. 4A.
Figure 8B:
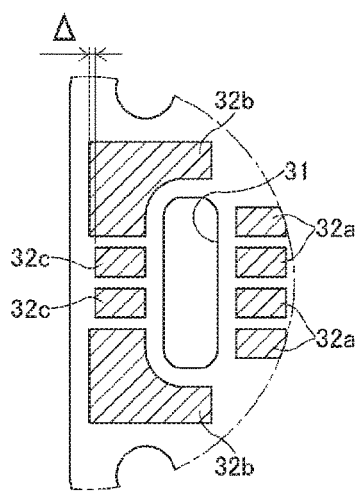
FIG. 8B is a plan view showing the main portions of the substrate before a pin header is fixed.

In FIG. 6, portions which are indicated by oblique lines in the substrate 30 are solder portions, and the plurality of pins 41 are soldered to the substrate 30 at the solder portions. FIG. 8A is a plan view showing portions of the pin header 40 and the substrate 30 shown in FIG. 6. FIG. 8B is a view showing a portion within a range indicated by a one-dot chain line VIIIB of the substrate 30 in FIG. 8A, and shows a state immediately before the pin header 40 is soldered to the substrate 30. In FIG. 8B, the solder portions are indicated by oblique lines.

Figure 8C:
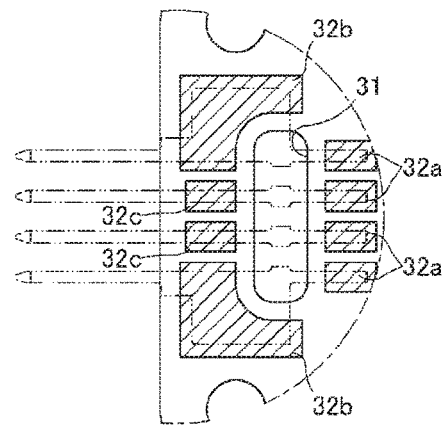
FIG. 8C is an explanatory view for explaining a position where the pin header is fixed to the main portions of the substrate.

Positions where the plurality of pins 41 are fixed to the substrate 30 by soldering are shown in FIG. 8C. In FIG. 8C, positions where the pins 41 are fixed by soldering are indicated by two-dot chain lines (the resin portion 42 is not shown).

Among the solder portions which are indicated by the oblique lines in FIGS. 8B and 8C, portions denoted by reference numeral 32a are portions for joining the base end portions 412 of the plurality of pins 41 and portions in the vicinity thereof (that is, conducting portions), and the pins 41 are fixed to the substrate 30 and are in electrically conduction with the circuit wiring of the substrate 30 through the solder portions 32a. Among the solder portions, portions denoted by reference numeral 32b are portions for joining portions including the protrusion portions 413 of the pins 41 at both ends in the arrangement direction of the plurality of pins 41. Soldering portions denoted by reference numeral 32c are portions for joining portions of two pins 41 on an inner side in the arrangement direction of the plurality of pins 41 between the tip end portions 411 and the base end portions 412. The soldering portions denoted by reference numerals 32b, 32c have a function of exclusively fixing the pins 41 to the substrate 30 and do not conduct the pins 41 with the circuit wiring of the substrate 30.

Soldering of the pin header 40 to the solder portions 32a, 32b, 32c described above is performed by printing solder pastes at positions corresponding to the solder portions 32a, 32b, 32c of the substrate 30, placing the pin header 41 such that the pins 41 are put on the positions indicated by the two-dot chain lines in FIG. 8C, and melting a solder in a reflow furnace.

In this manner, in addition to soldered joining portions at the solder portions 32a for the purpose of fixation to the substrate 30 and conduction of the pins 41 with the circuit wiring of the substrate 30, the pin header 40 is also fixed to the substrate 30 by soldered joining portions at the solder portions 32b, 32c only for the purpose of fixation to the substrate 30. Moreover, the solder portions 32b, 32c are positioned on one edge side of the substrate 30 with respect to the solder portions 32a. Therefore, even if a tensile force is applied to the pins 41 for some reason, a relatively large part of the tensile force which is applied to the pins 41 can be received by the joining portions of the solder portions 32b, 32c closer to the one edge of the substrate 30, and the tensile force extending to the joining portions as the conducting portions in the solder portions 32a can be effectively suppressed. Furthermore, the two pins 41 positioned at both ends of the plurality of pins 41 in the arrangement direction each include a projection portion 413 projecting therefrom, and portions of the pins 41 including the protrusion portion 413 are soldered to the substrate 30 with a relatively large area, so that the joining portions therebetween have particularly high fixing strength and can exhibit a large bearing force against the tensile force applied to the pins 41. Therefore, the tensile force extending to the joining portions as the conducting portions in the solder portions 32a can be more effectively suppressed. That is, it is possible to more effectively suppress the breakage of the joining portions of the solder portions 32a, which is responsible for the conduction between the pins 41 and the circuit wiring of the substrate 30, due to the tensile force applied to the pins 41.

As shown in FIG. 8C, the solder portions denoted by reference numeral 32a are disposed on one side of the recess portion 31 of the substrate 30, the solder portions denoted by reference numerals 32b, 32c are disposed on the other side of the recess portion 31 of the substrate 30. Accordingly, the plurality of pins 41 are soldered to the substrate 30 at two positions over the recess portion 31 respectively, so that the posture accuracy of the pins 41 is improved. Therefore, favorable contact performance between the pins 41 and the terminal of the socket connector can be obtained.

As shown in FIG. 8B, an end portion of the one edge side of the substrate 30 of the solder portions 32c, for fixing pins 41 in the inner side, is lower than an end portion of the one edge side of the substrate 30 of the solder portions 32b, for fixing portions including the protrusion portions 413 of the pins 41 positioned at both ends of the plurality of pins 41 in the arrangement direction, by a distance A, with respect to an opposite edge side (that is, a side opposite to the one edge of the substrate 30). Accordingly, when the tensile force is applied to the pins 41, the joining portions of the solder portions 32b closer to the one edge of the substrate 30 than the joining portions of the solder portions 32c receive a relatively large part of the tensile force. That is, since the relatively large part of the tensile force can be undertaken by the joining portions in the protrusion portions 413 having higher fixing strength, the breakage of the joining portions between the pins 41 and the substrate 30 due to the tensile force applied to the pins 41 can be effectively suppressed.

The present invention is not limited to the description of the embodiments of the invention and modifications thereof in any way. Various modifications are also included in the present invention as long as those skilled in the art can easily conceive without departing from the scope of the claims.

According to an aspect of the invention, there is provided an electronic device comprising: a substrate; a housing which covers the substrate; a conductive pin mounted on one edge portion of the substrate, wherein the conductive pin projects from the substrate along a plane of the substrate, the conductive pin includes a projection portion and a soldered portion which is soldered to the substrate, and the soldered portion includes a conducting portion which is electrically conduction with a circuit wiring of the substrate. According to the above configuration, since the conductive pin is directly mounted on the one edge portion of the substrate, the number of parts of the device can be reduced, as compared with a configuration in which a base connector separated from the substrate is used. This contributes to reduction in production cost of the device. In addition, the conductive pin is mounted so as to project from the substrate along the same plane as the substrate. This contributes to reduction in dimension of the electronic device in a thickness direction.

The conductive pin may include a plurality of conductive pins, and a first conducting pin and a second conductive pin positioned at both ends in a direction in which the plurality of conductive pins are arranged each may include a protrusion portion protruding from an outer edge thereof and including a portion soldered to the substrate. When a device including an electronic device is assembled, a cable extending from a mating connector connected to the conductive pin may be unexpectedly pulled and the tensile force may be applied to the conductive pin, and a large tensile stress may be generated at a joining portion between the conductive pin and the substrate. As a result, there is a possibility that breakage occurs at the joining portion, which may cause poor conduction. In this respect, according to the above configuration, since the first conductive pin and the second conductive pin positioned at both ends in the direction in which the plurality of conductive pins are arranged each includes the protrusion portion protruding from the outer edge thereof and including the portion soldered to the substrate, a wide joining area between the conductive pin and the substrate can be ensured by joining the protrusion portion to the substrate by soldering. Accordingly, sufficient fixing strength of the conductive pin with respect to the substrate can be ensured, and the large tensile stress as described above can be also coped with.

The protrusion portion may be closer to one edge side of the substrate than the conducting portion. When the tensile force is applied to the conductive pin as described above, there is a tendency that tensile stress concentrates on a portion of the joining portion of the conductive pin and the substrate at the most edge side of the substrate. In this respect, according to the above configuration, since the protrusion portion is closer to on the one edge side than the conducting portion, occurrence of the tensile stress at the joining portions of the conducting portions can be effectively suppressed and the large tensile stress generating at the joining portion of the protrusion portion can be effectively suppressed even if the tensile force is applied to the conductive pins as described above. That is, a relatively large part of the tensile force which is applied to the conductive pin can be received by the joining portion of the protrusion portion, and the tensile force extending to the joining portion of the conducting portion can be effectively suppressed. As a result, the possibility of breakage occurring at the joining portion of the conducting portion due to the tensile force applied to the conductive pin can be effectively reduced.

The plurality of conductive pins may include a third conductive pin positioned between the first conductive pin and the second conductive pin, and an end portion, which is close to one edge side of the substrate, of a portion, which is soldered to the substrate, of the protrusion portion may be closer to the one edge side of the substrate than an end portion, which is close to the one edge side of the substrate, of a portion, which is soldered to the substrate, of the third conductive pin. According to such a configuration, when the tensile force is applied to the conductive pin, a relatively large part of the tensile force is received by the joining portion of the protrusion portion where the end portion is positioned closer to the one edge side. As described above, since the joining portion of the protrusion portion has high fixing strength, a bearing force against the tensile force can be suitably exhibited.

The electronic device may further comprise a resin portion which includes: a connection portion connecting the plurality of conductive pins; and a projection portion, and the substrate may include a recess portion to which the projection portion is fitted. According to such a configuration, the positioning of the conductive pin with respect to the substrate can be reliably and accurately performed by fitting the projection portion of the resin portion to the recess portion of the substrate.

The plurality of conductive pins may be soldered to the substrate at a plurality of portions over the recess portion. According to such a configuration, even when the conductive pins are substantially rod-shaped members, posture accuracy of the conductive pins is improved since the plurality of portions over the recess portion are soldered to the substrate. Accordingly, favorable contact performance between the conductive pins and the terminal of the mating connector can be obtained.

What is claimed is:

1. An electronic device comprising:
    a substrate;
    a housing which covers the substrate;
    a conductive pin mounted on one edge portion of the substrate, wherein
    the conductive pin projects from the substrate along a plane of the substrate,
    the conductive pin includes a projection portion and a soldered portion which is soldered to the substrate,
    the projection portion includes a tip end portion,
    the soldered portion includes:
        a first soldered portion that is a conducting portion which is electrically conducting with a circuit wiring of the substrate and which includes a base end portion opposite to the tip end portion; and
        a second soldered portion that is arranged between the tip end portion and the base end portion.

2. The electronic device according to claim 1, wherein:
    the conductive pin includes a plurality of conductive pins, and
    a first conducting pin and a second conductive pin positioned at both ends in a direction in which the plurality of conductive pins are arranged each includes a protrusion portion protruding from an outer edge thereof and including a third soldered portion soldered to the substrate.

3. The electronic device according to claim 2, wherein the protrusion portion is closer to one edge side of the substrate than the conducting portion.

4. The electronic device according to claim 2, wherein:
    the plurality of conductive pins include a third conductive pin positioned between the first conductive pin and the second conductive pin, and
    an end portion, which is close to one edge side of the substrate, of the third soldered portion of the protrusion portion is closer to the one edge side of the substrate than an end portion, which is close to the one edge side of the substrate, of the second soldered portion of the third conductive pin.

5. The electronic device according to claim 2, further comprising
    a resin portion which includes:
        a connection portion connecting the plurality of conductive pins; and
        a projection portion, wherein
    the substrate includes a recess portion to which the projection portion is fitted.

6. The electronic device according to claim 5, wherein the plurality of conductive pins are soldered to the substrate at a plurality of portions over the recess portion.

7. The electronic device according to claim 5, wherein:
    the projection portion includes a first projection portion projecting to one side of a direction orthogonal to a plane on which the plurality of conductive pins are arranged and a second projection portion projecting to the other side of the direction orthogonal to the plane on which the plurality of conductive pins are arranged, and
    the first projection portion is fitted to the recess portion.

* * * * *